US010797941B2

(12) United States Patent
Sharma et al.

(10) Patent No.: US 10,797,941 B2
(45) Date of Patent: Oct. 6, 2020

(54) DETERMINING NETWORK ELEMENT ANALYTICS AND NETWORKING RECOMMENDATIONS BASED THEREON

(71) Applicant: Cisco Technology, Inc., San Jose, CA (US)

(72) Inventors: Samar Sharma, San Jose, CA (US); Rakesh B. Goudar, Cupertino, CA (US); Chandrashekarappa Surekha Puttasubbappa, San Jose, CA (US); John Andrew Fingerhut, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 188 days.

(21) Appl. No.: 15/647,459

(22) Filed: Jul. 12, 2017

(65) Prior Publication Data

US 2018/0019913 A1 Jan. 18, 2018

Related U.S. Application Data

(60) Provisional application No. 62/361,975, filed on Jul. 13, 2016, provisional application No. 62/361,940, filed on Jul. 13, 2016.

(51) Int. Cl.
G06F 15/16 (2006.01)
H04L 12/24 (2006.01)
(Continued)

(52) U.S. Cl.
CPC .......... *H04L 41/08* (2013.01); *H04L 41/0803* (2013.01); *H04L 41/0823* (2013.01); *H04L 41/0883* (2013.01); *H04L 41/142* (2013.01);
*H04L 43/0817* (2013.01); *H04L 43/0876* (2013.01); *H04L 41/0896* (2013.01); *H04L 41/50* (2013.01); *H04L 43/022* (2013.01); *H04L 47/24* (2013.01)

(58) Field of Classification Search
CPC ........................ H04L 41/0823; H04L 41/0883
See application file for complete search history.

(56) References Cited

U.S. PATENT DOCUMENTS 6,516,383 B1 2/2003 Patra et al.
6,549,442 B1* 4/2003 Lu .......................... G11C 15/00
365/230.03
(Continued)

OTHER PUBLICATIONS

Gao, "Nexus 7000 TCAM Bank Limitations and Bank Chain Configuration", Jun. 18 2013, Cisco TAC Document ID 116151. (Year: 2013).*

(Continued)

*Primary Examiner* — Douglas B Blair
(74) *Attorney, Agent, or Firm* — Edell, Shapiro & Finnan, LLC

(57) ABSTRACT

A network element includes one or more hardware memory resources of fixed storage capacity for storing data used to configure a plurality of networking features of the network element. A utilization management process runs on the network element to perform operations including obtaining utilization data representing utilization of the one or more hardware memory resources, and analyzing the utilization data of the one or more hardware memory resources to produce summarized utilization data.

20 Claims, 11 Drawing Sheets

(51) Int. Cl.
*H04L 12/26* (2006.01)
*H04L 12/851* (2013.01)

(56) References Cited

U.S. PATENT DOCUMENTS

| | | | | |
|---|---|---|---|---|
| 6,862,623 | B1* | 3/2005 | Odhner | G06Q 10/06 709/226 |
| 6,898,564 | B1* | 5/2005 | Odhner | G06F 11/3414 703/2 |
| 6,950,865 | B1* | 9/2005 | Depaolantonio | H04L 43/065 709/223 |
| 7,818,489 | B2* | 10/2010 | Karamcheti | G06F 9/5016 711/101 |
| 8,176,242 | B1 | 5/2012 | Shamis et al. | |
| 8,738,972 | B1* | 5/2014 | Bakman | G06F 11/0712 714/47.1 |
| 8,825,858 | B1* | 9/2014 | Atchity | H04L 47/788 709/224 |
| 8,937,945 | B2 | 1/2015 | Kompella et al. | |
| 9,577,932 | B2 | 2/2017 | Ravipati et al. | |
| 9,588,917 | B2* | 3/2017 | Kotta | G06F 13/28 |
| 9,692,705 | B1* | 6/2017 | Zhou | H04L 45/54 |
| 2003/0158765 | A1* | 8/2003 | Ngi | G06Q 10/06312 705/7.22 |
| 2005/0102121 | A1* | 5/2005 | Odhner | G06F 11/3414 703/1 |
| 2006/0200622 | A1* | 9/2006 | Ahuja | G11C 15/00 711/108 |
| 2007/0156379 | A1* | 7/2007 | Kulkarni | G06F 30/30 703/14 |
| 2010/0281482 | A1* | 11/2010 | Pike | G06F 9/44505 718/102 |
| 2011/0161580 | A1 | 6/2011 | Shah et al. | |
| 2011/0205931 | A1* | 8/2011 | Zhou | H04L 43/026 370/253 |
| 2012/0096473 | A1* | 4/2012 | Durham | G06F 9/5077 718/105 |
| 2012/0131309 | A1* | 5/2012 | Johnson | G06F 9/30 712/41 |
| 2012/0214504 | A1* | 8/2012 | Zha | H04W 24/08 455/456.1 |
| 2014/0032591 | A1 | 1/2014 | Li et al. | |
| 2014/0032872 | A1* | 1/2014 | Vasavi | G06F 3/0605 711/172 |
| 2014/0075108 | A1* | 3/2014 | Dong | H04L 12/6418 711/108 |
| 2014/0108718 | A1 | 4/2014 | Chen et al. | |
| 2015/0046230 | A1* | 2/2015 | Laksman | G06F 16/24 705/7.39 |
| 2015/0120906 | A1* | 4/2015 | Dowling | G06F 11/3409 709/224 |
| 2016/0124773 | A1* | 5/2016 | Gaurav | G06F 9/50 718/104 |
| 2016/0342510 | A1* | 11/2016 | Pani | G06F 12/0615 |
| 2017/0097845 | A1* | 4/2017 | Kouznetsov | G06F 9/45558 |
| 2017/0126563 | A1* | 5/2017 | Nanda | H04L 49/25 |
| 2017/0134277 | A1* | 5/2017 | Bifulco | H04L 49/70 |
| 2017/0147519 | A1* | 5/2017 | Kotta | G06F 13/28 |
| 2017/0346711 | A1* | 11/2017 | Jones-McFadden | H04L 47/803 |

OTHER PUBLICATIONS

William Cohen, "Determining whether an application has poor cache performance", RHD Blog, Mar. 10, 2014, https://developers.redhat.com/blog/2014/03/10/determining-whether-an-application-has-po . . . , 7 pages.

Charlie Schluting, "On Your Network: What the Heck is a TCAM?", Aug. 12, 2005, http://www.enterprisenetworkingplanet.com/netsysm/article.php/3527301/On-Your-Network-What-the-Heck-is-a-TCAM.htm, 1 page.

Andrisoft, "What means TCAM Utilization and ICAM Utilization?", Dec. 26, 2012, 1 page.

"ACL and QoS TCAM Exhaustion Avoidance an Catalyst 4500 Switches", Oct. 27, 2007, Cisco, http://www.cisco.com/c/en/us/support/docs/switches/catalyst-4000-serie . . . , 15 pages.

"Catalyst 6500 Series Switches Netflow TCAM Utilization Management", Document ID: 116434, Aug. 20, 2013, Cisco, http://www.cisco.com/c/en/us/support/docs/switches/catalyst-6500-serie . . . , 4 pages.

R. Lacoste, et al., "CCNP Routing and Switching TSHOOT 300-135 Official Cert Guide: Troubleshooting Device Performance", Dec. 9, 2014, ciscopress.com, http://www.ciscopress.com/articles/printerfriendly/2264831, 30 pages.

"Troubleshooting High CPU Utilization", Mar. 16, 2016, Cisco, http://www.cisco.com/c/en/us/td/docs/switches/lan/catalyst3750/software . . . , 26 pages.

Hewlett-Packard Development Company, L.P., "Task Usage Reporting", https://techhub.hpe.com/eginfolib/networking/docs/switches/K-KA-KB/15/18/5998-8160_ssw_mcg/content/apas31.html, downloaded Apr. 20, 2020, 4 pages.

Dell Inc., "Dell Networking Command Line Reference Guide for the MXL 10/40GbE Switch I/O Module 9.7(0.0)", Jan. 2015, 1264 pages.

"System Commands", https://documentation.nokia.com/html1/0_add-h-f/93-0070-10-01/7750_SR_OS_System_Basics_Guide/system-CLI-Show-CLI.html, downloaded Apr. 20, 2020, 70 pages.

Lenovo, "ISCLI—Industry Standard CLI Command Reference for Lenovo Enterprise Network Operating System 8.4", Lenovo RackSwitch G8272, Jul. 2017, 794 pages.

Juniper Networks, "Using the Juniper Network Fabric Monitoring Dashboard", Jun. 29, 2017, 2 pages.

Juniper Networks, "Check the Routing CPU Memory Usage", Dec. 25, 2019, 11 pages.

Huawei Technologies Co., Ltd., "High CPU Usage on S Series Switches", https://support.huawei.com/enterprise/en/doc/EDOC1100088101#EN-US_TOPIC_0173223794, Apr. 9, 2020, 146 pages.

Huawei Technologies Co., Ltd., "Configuration Guide—Device Management", downloaded Apr. 20, 2020, https://support.huawei.com/enterprise/en/doc/EDOC1000178167/1d4b04d2/displaying-the-memory-usage, 3 pages.

* cited by examiner

BEFORE RECOMMENDATION, TCAM UTILIZATION:

IGRESS RESOURCES 300

| FEATURE | INST# | TCAM# | BANK# | FEATURE_ENTRIES | FREE ENTRIES | PERCENT_UTIL |
|---|---|---|---|---|---|---|
| RACL | 1 | 2 | 1 | 13109 | 8821 | 40.03 |
| VACL | 1 | 2 | 1 | 1867 | 8821 | 5.70 |
| PBR | 1 | 2 | 1 | 8108 | 8821 | 24.76 |
| QoS | 1 | 1 | 2 | 3823 | 28924 | 11.67 |
| COPP | 1 | 2 | 2 | 310 | 32310 | 0.95 |
| COPP | 2 | 2 | 2 | 310 | 32310 | 0.95 |
| WCCP | 1 | 2 | 1 | 835 | 8821 | 2.55 |
| FEX CONTROL | 1 | 2 | 1 | 4 | 8821 | 0.01 |
| FEX CONTROL | 2 | 2 | 1 | 4 | 32740 | 0.01 |

EGRESS RESOURCES 320

| FEATURE | INST# | TCAM# | BANK# | FEATURE_ENTRIES | FREE ENTRIES | PERCENT_UTIL |
|---|---|---|---|---|---|---|
| RACL | 1 | 2 | 1 | 3 | 8821 | 0.01 |
| RACL | 2 | 2 | 1 | 3 | 32740 | 0.01 |
| VACL | 1 | 1 | 1 | 1867 | 30878 | 5.70 |
| VACL | 2 | 1 | 1 | 1867 | 30878 | 5.70 |
| NVE | 1 | 1 | 1 | 3 | 30878 | 0.01 |
| NVE | 2 | 1 | 1 | 3 | 30878 | 0.01 |
| NVE RDT | 1 | 1 | 2 | 1 | 28924 | 0.00 |
| NVE RDT | 2 | 1 | 2 | 1 | 32747 | 0.00 |

FIG.3A

AFTER APPLYING RECOMMENDATION #1, TCAM UTILIZATION:

IGRESS RESOURCES 330

| FEATURE | INST# | TCAM# | BANK# | FEATURE_ENTRIES | FREE ENTRIES | PERCENT_UTIL |
|---|---|---|---|---|---|---|
| RACL | 1 | 2 | 1 | 8387 | 13543 | 25.61 |
| VACL | 1 | 2 | 1 | 1867 | 13543 | 5.70 |
| PBR | 1 | 2 | 1 | 8108 | 13543 | 24.76 |
| QoS | 1 | 1 | 2 | 3823 | 28924 | 11.67 |
| COPP | 1 | 2 | 2 | 310 | 32310 | 0.95 |
| COPP | 2 | 2 | 2 | 310 | 32310 | 0.95 |
| WCCP | 1 | 2 | 1 | 835 | 13543 | 2.55 |
| FEX CONTROL | 1 | 2 | 1 | 4 | 13543 | 0.01 |
| FEX CONTROL | 2 | 2 | 1 | 4 | 32740 | 0.01 |

EGRESS RESOURCES 340

| FEATURE | INST# | TCAM# | BANK# | FEATURE_ENTRIES | FREE ENTRIES | PERCENT_UTIL |
|---|---|---|---|---|---|---|
| RACL | 1 | 2 | 1 | 3 | 13543 | 0.01 |
| RACL | 2 | 2 | 1 | 3 | 32740 | 0.01 |
| VACL | 1 | 1 | 1 | 1867 | 30878 | 5.70 |
| VACL | 2 | 1 | 1 | 1867 | 30878 | 5.70 |
| NVE | 1 | 1 | 1 | 3 | 30878 | 0.01 |
| NVE | 2 | 1 | 1 | 3 | 30878 | 0.01 |
| NVE RDT | 1 | 1 | 2 | 1 | 28924 | 0.00 |
| NVE RDT | 2 | 1 | 2 | 1 | 32747 | 0.00 |

FIG.3B

AFTER APPLYING RECOMMENDATION #2, TCAM UTILIZATION

IGRESS RESOURCES 350

| FEATURE | INST# | TCAM# | BANK# | FEATURE_ENTRIES | FREE ENTRIES | PERCENT_UTIL |
|---|---|---|---|---|---|---|
| RACL | 1 | 2 | 1 | 11345 | 12349 | 34.84 |
| VACL | 1 | 2 | 1 | 1867 | 12349 | 5.70 |
| PBR | 1 | 2 | 1 | 6344 | 12349 | 19.37 |
| QOS | 1 | 1 | 2 | 3823 | 28924 | 11.67 |
| COPP | 1 | 2 | 2 | 310 | 32310 | 0.95 |
| COPP | 2 | 2 | 2 | 310 | 32310 | 0.95 |
| WCCP | 1 | 2 | 1 | 835 | 12349 | 2.55 |
| FEX CONTROL | 1 | 2 | 1 | 4 | 12349 | 0.01 |
| FEX CONTROL | 2 | 2 | 1 | 4 | 32740 | 0.01 |

EGRESS RESOURCES 360

| FEATURE | INST# | TCAM# | BANK# | FEATURE_ENTRIES | FREE ENTRIES | PERCENT_UTIL |
|---|---|---|---|---|---|---|
| RACL | 1 | 2 | 1 | 3 | 12349 | 0.01 |
| RACL | 2 | 2 | 1 | 3 | 32740 | 0.01 |
| VACL | 1 | 1 | 1 | 1867 | 30878 | 5.70 |
| VACL | 2 | 1 | 1 | 1867 | 30878 | 5.70 |
| NVE | 1 | 1 | 1 | 3 | 30878 | 0.01 |
| NVE | 2 | 1 | 1 | 3 | 30878 | 0.01 |
| NVE RDT | 1 | 1 | 2 | 1 | 28924 | 0.00 |
| NVE RDT | 2 | 1 | 2 | 1 | 32747 | 0.00 |

FIG.3C

DETERMINING NETWORK ELEMENT ANALYTICS AND NETWORKING RECOMMENDATIONS BASED THEREON

PRIORITY CLAIM

This application claims priority to U.S. Provisional Application No. 62/361,975, filed Jul. 13, 2016, and to U.S. Provisional Application No. 62/361,940, filed Jul. 13, 2016, the entirety of each of said applications is incorporated herein by reference.

TECHNICAL FIELD

The present disclosure relates to networks, and in particular to monitoring network elements and adjusting operation of the networks elements in a network.

BACKGROUND

End users have more communications choices than ever before. A number of prominent technological trends are currently afoot (e.g., more computing devices, more online video services, more Internet video traffic), and these trends are changing the network delivery landscape. One change is that networking architectures have grown increasingly complex in communication environments. As the number of end users increases and/or becomes mobile, efficient management and proper routing of communication sessions and data flows becomes important.

BRIEF DESCRIPTION OF THE DRAWINGS

FIG. 3A illustrates a table indicating utilization of a TCAM prior to implementation of improvement recommendations, according to an example embodiment.

FIGS. 3B and 3C illustrate tables indicating utilization of a hardware memory resource after implementation of improvement recommendations, according to an example embodiment.

DESCRIPTION OF EXAMPLE EMBODIMENTS

Overview

In one embodiment, a network element includes one or more hardware memory resources of fixed storage capacity for storing data used to configure a plurality of networking features of the network element. A utilization management process runs on the network element to perform operations including obtaining utilization data representing utilization of the one or more hardware memory resources, and analyzing the utilization data of the one or more hardware memory resources to produce summarized utilization data.

Example Embodiments

Figure 1:
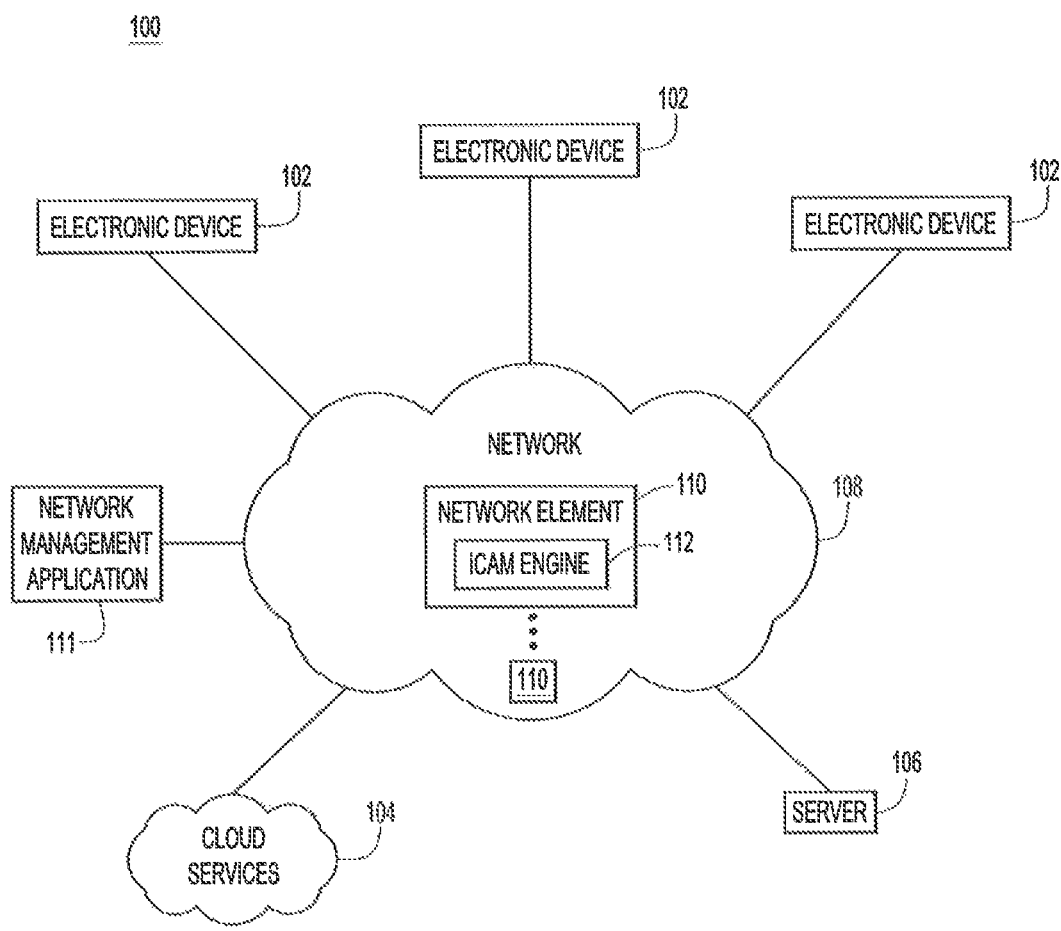
FIG. 1 is a block diagram of a system for determining analytics related to a network and for generating recommendations to improve network performance based on network analytics determined for the network, according to an example embodiment.

With reference made first to FIG. 1, a simplified block diagram is shown of a communication system 100 for determining analytics related to a network and for generating recommendations to improve network performance based on network analytics determined for the network. Communication system 100 can include one or more electronic devices 102, cloud services 104, and server 106. Electronic devices 102, cloud services 104, and server 106 can be in communication using network 108. Network 108 can include a network element 110, but in general, includes a plurality of network elements.

In an example implementation, cloud network 104, server 106, and network element 110, are meant to encompass network appliances, servers, routers, switches, security appliances, gateways, bridges, load balancers, processors, access points, modules, or any other suitable device, component, element, or object operable to exchange information in a network environment, or any other type of network element (physical or virtual) now known or hereinafter developed. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Network element 110 includes an intelligent Comprehensive Analytics and Machine Learning (iCAM) engine 112 whose functionality is described in more detail below.

The electronic device 102 is any device that has network connectivity to the network 108, and is configured to use the network 108 to send and receive data. The electronic device 102 may be a desktop computer, laptop computer, mobile wireless communication device (e.g., cellphone or smartphone), tablet, etc. The server 106 may be a web server, application server or any server configured to provide a service or function over the network 108 on behalf of one or more of the electronic devices. In an example, each electronic device 102 can request and receive data from cloud services 104 and/or server 106. Network element 110 can help facilitate the communication between electronic devices 102, cloud services 104, and server 106. To provide proper communication between the network elements of communication system 100, a network manager may determine the analytics of a network assisting with the network communications.

The iCAM engine 112 can be configured to provide analytics related to the network and to generate recommendations for the network. Said another way, iCAM engine 112 performs a utilization management process, and thus, the functions of iCAM engine 112 may be referred to herein as a utilization management process. More specifically, iCAM engine 112 can be configured to generates analytics related to usage of ternary content addressable memory (TCAM) in the network element 110 and provide a network manager with a relatively clear view of the TCAM resource utilization per networking feature, as well as how a networking configuration, especially access list entries, translates into hardware TCAM entries and which networking feature goes to which bank, how to optimize the access list entries, etc. The TCAM utilization data generated by the iCAM engine 112 can be sent, via network 108, to a network management application 111. A network manager/network administrator can study TCAM utilization data presented via the network management application 11 to determine how to effectively utilize the TCAM space and help properly configure the network and allow proper communication between the network elements of communication system 100. However, as described in more detail, the iCAM engine 112 may analyze the TCAM utilization data to generate recommendations for altering one or more configurations of one or more networking features on the network element, and in some embodiments, automatically implement those configuration modifications to improve utilization of the TCAM as well as improve overall performance of the network element 110 in the network 108. Further still, the iCAM engine 112 may send the TCAM utilization data to the network management application 111 and the network management application 111 may perform the analysis on the TCAM utilization data to generate recommendations to alter the configurations of one or more networking features on the network element 110, or automatically configure the network element 110 with the configuration modifications.

For purposes of illustrating certain example techniques of communication system 100, the following foundational information may be viewed as a basis from which the present disclosure may be properly explained.

Networking architectures continue to grow increasingly complex in communication environments. As the number of end users increases and/or becomes mobile, efficient management and proper routing of communication sessions and data flows becomes critical. One particular type of network where efficient management is crucial is data centers. Data centers serve a large portion of the Internet content today, including web objects (text, graphics, Uniform Resource Locators (URLs) and scripts), downloadable objects (media files, software, documents), applications (c-commerce, portals), live streaming media, on demand streaming media, and social networks.

Currently, network managers do not have an overall view of how many entries of a hardware memory resource, such as TCAM or static random access memory (SRAM), are being used with respect to various networking features or combination of networking features. Moreover, network managers often find it difficult to understand how to improve a configuration, especially for a data center. For example, for the access control list (ACL) Classification TCAM, some network managers do not have a clear overall view of the resource and how the access list entries translate into hardware TCAM entries, and more specifically, how the TCAM is utilized per features such as Router-ACL (RACL), virtual local area network (VLAN)-ACL (VACL), Port-ACL (PACL), or a combination of RACL+VACL and many more L3/L2 ACL/QoS features. Moreover, it is useful to know which networking feature goes to which bank, how to optimize the access list entries, etc. Often, a network manager tries various combinations until they come up with a configuration that fits in the hardware. This can be time consuming and frustrating. As a result, some network managers may have difficulty determining which feature/combination is consuming more hardware resources and/or which TCAM/bank is loaded with more feature resources. Hence, there is a need for a system and method to determine analytics related to (network elements) in a network, and to use those analytics to generate recommendations for improving the (network elements in the) network. When reference is made herein to determining analytics for a network, it is to be understood that this means determining analytics for one or more network elements in the network. Moreover, when it is referred to herein to generating recommendations for the network, it is to be understood that this means generating one or more recommendations for changing a configuration of one or more network elements of the network.

A communication system, as outlined in FIG. 1, can resolve these issues (and others). Communication system 100 may be configured to determine analytics related to a network, and to generate recommendations based on the analytics. In a specific example, communication system 100 can be configured to include an iCAM engine (e.g., iCAM engine 112) on a supervisor engine (e.g., supervisor 114 illustrated in FIG. 2) or located in some other network element. The iCAM engine 112 can be configured to interact with various processes (e.g., driver software for a TCAM portion of a network) to collect the hardware resource utilization data. The hardware (memory) resource utilization data can be processed and summarize on a per feature basis. The processed and summarized hardware resource utilization data can be communicated to a network manager (or network manager) to provide analytics related to the network, and may be used to recommend changes to the network that may improve the network. The processed and summarized hardware resource utilization data and the recommended changes can be communicated to a network manager (or network manager) to try and improve the performance of the network. The analytics and recommendations can be used by the network manager to help determine how the configuration of the network can be improved, especially access list entries translate into hardware TCAM entries and which feature goes to which bank, how to optimize the access list entries, etc.

As a result, network managers are able to receive a consolidated clear view of how a configuration, especially access list entries, translate into utilization of hardware resources, that is the number of utilized TCAM entries, and which networking feature goes to which bank, how to optimize the access list entries, etc. Based on the feature resource usage, the network manager can attempt to effectively use the TCAM hardware space. The summarized hardware resource utilization data can also provide the network manager with an indication of which feature goes to which TCAM/bank, how each forwarding engine is loaded with features, total used and free entries per forwarding engine and TCAM/bank, how the access list entries translate into hardware TCAM entries and which feature goes to which bank, how to optimize the access list entries, and other information or data that may help a network manager view or otherwise determine analytics related to the network and improve the performance of the network. By standardizing Application Programming Interfaces (APIs) and associated messages, the same information can be leveraged across other networks. The above examples are only illustrative examples and other means or methods may be used to determine analytics related to a network.

Generally, communication system 100 can be implemented in any type or topology of network. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 can include any number of hardware or software elements coupled to (and in communication with) each other through a communications medium. In an example, network 108 is a data center and iCAM engine 112 can help provide analytics and one or more recommendations to help improve the performance of the data center. In another example, network 108 can include one or more platforms. The examples, particular arrangements, configurations, etc. described in the present disclosure can be applied to one or more networks or platforms.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

As used herein, a 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for determining analytics related to a network.

In one implementation, network elements implementing the determination/generation of analytics related to network features and recommendations based on the analytics described herein may include software to achieve (or to foster) the functions discussed herein for providing and processing when the software is executed on one or more processors to carry out the functions. This could include the implementation of instances of modules (e.g., iCAM engine 112) and/or any other suitable element that would foster the activities discussed herein. Additionally, each of these elements can have an internal structure (e.g., a processor, a memory element, etc.) to facilitate some of the operations described herein. In other embodiments, these functions for the determination of analytics and recommendations based on the analytics may be executed externally to these elements, or included in some other network element to achieve the intended functionality. Alternatively, network elements may include software (or reciprocating software) that can coordinate with other network elements in order to achieve determination of analytics related to a network described herein. In still other embodiments, one or several devices may include any suitable algorithms, hardware, software, components, modules, interfaces, or objects that facilitate the operations thereof.

In regards to the internal structure associated with communication system 100, electronic devices 102, cloud network 104, server 106, and network element 110 can each include memory elements for storing information to be used in the operations outlined herein. Each of electronic devices 102, cloud network 104, server 106, and network element 110 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable time frame. Any such storage options may also be included within the broad term 'memory element' as used herein.

In certain example implementations, the recommendation system based on network analytics functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the recommendation system based on network analytics functions, as outlined herein. Additionally, each of these devices may include a processor that can execute software or an algorithm to perform the functions of as described herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100 may include software modules (e.g., iCAM engine 112) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 102, cloud network 104, server 106, and network element 110 each may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102 can include user devices. Cloud network 104 may generally be defined as the use of computing resources that are delivered as a service over a network, such as the Internet. The services may be distributed and separated to provide required support for electronic devices. Typically, compute, storage, and network resources are offered in a cloud infrastructure, effectively shifting the workload from a local network to the cloud network. Server 106 can be a network element such as a physical server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication systems 100.

Figure 2:
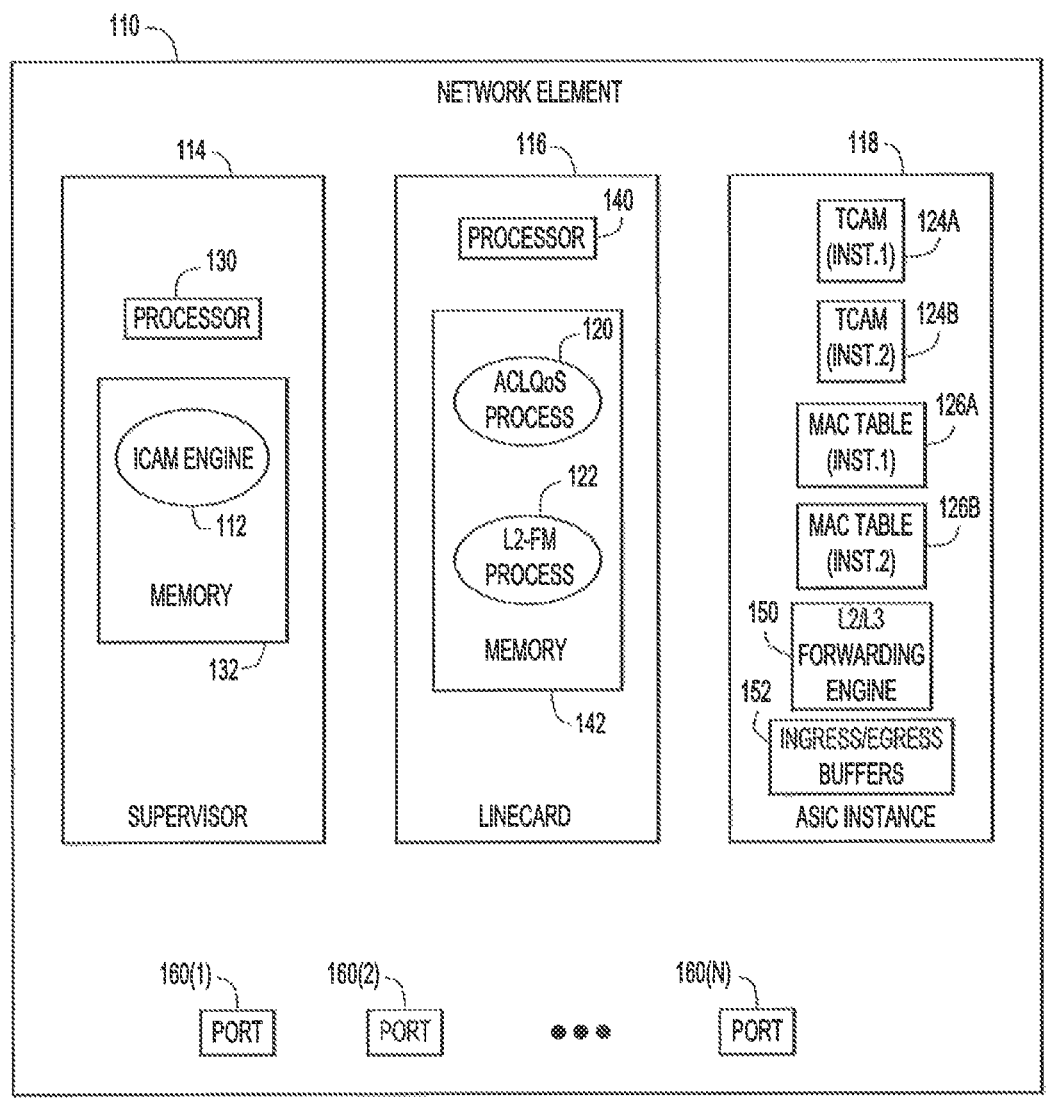
FIG. 2 is a block diagram of a network element configured to generate and analyze analytics related to utilization of a hardware memory resource of the network element, according to an example embodiment.

Turning to FIG. 2, network element 110 may include a supervisor 114, a linecard 116, and an ASIC instance 118. While one linecard 114 is shown in FIG. 2, it is to be understood that network element 110 may have multiple linecards. Supervisor 114 can include iCAM engine 112. Linecard 116 can include an ACLQoS process 120 and a L2-FM process 122. ASIC instance 118 can include TCAMs 124a and 124b and MAC tables 126a and 126b. In an example, iCAM engine 112 may be located outside supervisor 114. The supervisor 114 includes a processor 130 and memory 132. The iCAM engine 112, in one form, is embodied by instructions stored in memory 132 and executed by the processor 130. The processor 130 may be embodied by one or more microprocessors or microcontrollers. There are also a plurality of ports 160(1)-160(N) at which ingress traffic is received at the network element 110 and from which egress traffic is sent.

In a specific example, ACLQoS process 120 can be embodied by a software and the L2-FM process 122 may also be embodied by software. To this end, FIG. 2 shows a processor 140 and memory 140 in linecard 116, and that the instructions for the ACLQoS process 120 and instructions for the L2-FM process 122 are stored in memory 142. The ACLQoS process 120 talks to a Layer3 driver to program hardware resources for Layer 3 and Layer 2 classification-based security policies like RACL, VACL, PACL, PBR, QoS, etc. The L2-FM process 122 may include software that talks to the Layer2 driver to learn and program the Media Access Control (MAC) address tables.

ASIC instance 118 can include a L2/L3 Forwarding Engine 150 with the TCAM and Ingress/Egress Buffers 152. These components may be embodied as a System On Chip (SOC). There can be multiple SOCs, and each SOC is referred to an ASIC Instance.

In an example, iCAM engine 112 can be configured to interact with various component/functions on linecard 116 (e.g., ACLQoS process 120, and L2-FM process 122) to collect hardware resource utilization data and provide a recommendation based on network analytics. iCAM engine 112 can also be configured to analyze the data and communicate a summarized output as well as recommendations for improving the network. For example, the summarized output may be one or more tables displayed on a screen by the network management application 111 (FIG. 1) for viewing by a network manager.

In a specific example, iCAM engine 112 can be configured to send a messaging and transaction service (MTS) message to ACLQoS process 120 and L2-FM process 122 on all the linecards for which the data is requested. ACLQoS process 120 can collect hardware resource utilization data for the virtual device contexts (VDCs) and destinations per feature. The data can be used to populate an iCAM data structure and ACLQoS process 120 can reply back with the MTS payload to iCAM engine 112. iCAM engine 112 can receive the data and create a formatted output to help a network manager get a quick overview of the resource utilization per feature. Moreover, iCAM engine 112 can receive the data and create a formatted output to help the network manager get a quick overview of the changes to the network that can improve the performance of the network.

Turning now to FIGS. 3A, 3B, and 3C, further details of the hardware memory resource utilization analytics and recommendation techniques are now described. FIGS. 3A, 3B and 3C illustrate simplified tables of data generated by iCAM engine 112 that may be associated with determining analytics related to a network and to provide recommendations based on the analytics, in accordance with an embodiment.

Referring first to FIG. 3A, a table is shown containing hardware memory resource (e.g., TCAM) utilization for a network element on which a plurality of networking features are configured, including RACL, VACL, Policy-Based Routing (PBR), QoS, Control Plane Policing (CoPP), Web Cache Communication Protocol (WCCP, a content-based routing technology developed by Cisco Systems, Inc.), Fabric Extender Control (FEXControl, an extensible and a scalable fabric technology developed by Cisco Systems, Inc.), and Network Virtual Endpoint (NVE). Table 300 shows utilization data of the ingress resources (Igress Resources) and table 320 shows utilization data of the egress resources (Egress Resources). For each of the features listed, the tables 300 and 320 include a column/field for each of: instance number (Inst#) indicating the SOC number (there may be multiple SOC/forwarding engines per linecard), TCAM# indicating which particular TCAM instance that feature is using, Bank# indicating which bank that feature is using, Feature_Entries indicating how many TCAM entries that feature is using, Free Entries indicating how many free entries there are from that feature, and Percent_Utilization (Percent_Util) indicating how much of a TCAM that particular feature is using. For example, for the networking feature RACL usage of the Igress Resources as shown in table 300, it is using TCAM 2, Bank 2, occupies 13109 entries in TCAM 2, has 8821 free entries, and is using 40.03 percent utilization of TCAM 2. Similarly, for networking feature RACL usage of the Egress Resources as shown in table 320, it is using TCAM 2, Bank 1, 3 entries in TCAM 2, has 8821 free entries, and a 0.01 percent utilization of TCAM 2.

The iCAM engine 112 may perform analysis of the TCAM utilization data as depicted in FIG. 3A and based on knowledge of networking features, generate a recommendation to improve the TCAM utilization. For example, the recommendations may be:
Recommendation 1. Disabling statistics on access-list "5000_vmrs" will save 4722 TCAM entries.
Recommendation 2. Changing logical operator unit (LOU) threshold from 5 to 1 saves approximately 11% of TCAM entries.

FIG. 3B shows the TCAM utilization data in tables 330 and 340 after Recommendation 1 is applied. As depicted in table 330, the number of entries used by the RACL feature dropped significantly to 8387, resulting in a percent utilization of 25.61 as shown in table 330, as opposed to a percent utilization of 40.03, as shown in FIG. 3B for RACL.

FIG. 3C shows the TCAM utilization data in tables 350 and 360 after Recommendation 2 is applied. Table 350 shows that the number of entries for the RACL feature is reduced to 11345, with a reduced percent utilization of 34.64, and the number of entries for the PBR feature is reduced to 6344, with a reduced percent utilization of 19.37.

The iCAM engine 112 can be configured to use TCAM analytics and inform a network manager as to how the configuration, especially access list entries translate into hardware TCAM entries and which feature goes to which bank, how to optimize the access list entries, etc. For example, iCAM engine 112 can be configured to provide suggested changes such as allowing a TCAM merge, allow bank chaining, allow cross-product of one or more features, changing (reducing) the LOU threshold value, removing statistics from the access list, etc. In addition, iCAM engine 112 can provide addition details if the changes are made, for example, 2000 entries can be saved if TCAM merge is allowed, 4000 more ACL entries can be stored if bank chaining is allowed, 6 times more TCAM entries can result if cross product of multiple features is used, changing (reducing) the LOU threshold value from 5 to 1 will reduce the number of TCAM entries by 10%, removing the statistics from the access lists will save 15% of TCAM entries, etc.

The iCAM engine 112 can also provide suggested changes such as allowing a TCAM merge, allow bank chaining, allow cross-product of one or more features, chaining the Logical Operator Unit (LOU) threshold value, removing statistics from the access list, etc. In an example, iCAM engine can provide addition details if the changes are made for example, 2000 entries can be saved if TCAM merge is allowed, 4000 more ACL entries can be stored if bank chaining is allowed, 6 times more TCAM entries can result if cross product of multiple features is used, changing the LOU threshold value from 5 to 1 will reduce the number of TCAM entries by 10%, removing the statistics from the access lists will save 15% of TCAM entries, etc. The additional data can help the network manager determine what changes to the network should be made without having to go through the time consuming effort of trial and error or trying multiple configurations to determine a configuration that fits the hardware. The above examples are only illustrative examples and other means or methods may be used by a recommendation system based on TCAM and hardware tables. The above examples are only illustrative examples and other means or methods may be used in the context of a recommendation system based on network analytics.

Figure 4:
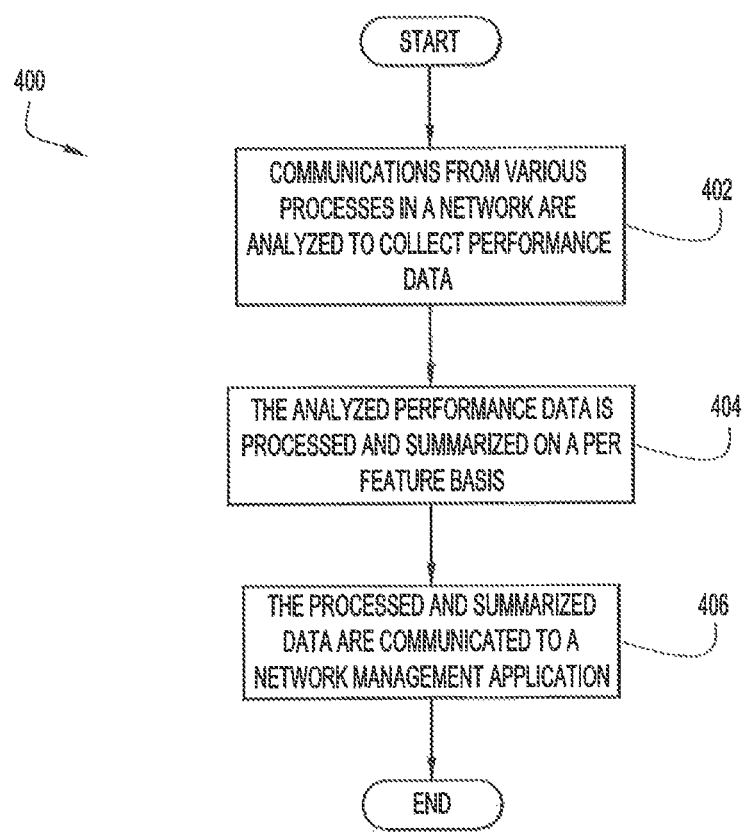
FIG. 4 is a high-level flow chart of a method for generating and communicating per feature based utilization data of a hardware memory resource on a network element, according to an example embodiment.

Reference is now made to FIG. 4. FIG. 4 is a simplified flow chart of a process 400 that may be associated with the determination of analytics related to a network, in accordance with an embodiment. In an embodiment, one or more operations of process 400 may be performed by iCAM engine 112. At 402, communications from various processes in a network are analyzed to collect performance data. For example, iCAM engine 112 can be configured to interact with various processes to collect the hardware resource utilization data. At 404, the analyzed performance data is processed and summarized on a per feature basis. For example, iCAM engine can be configured to processed and summarize hardware resource utilization data on a per feature basis. At 406, the processed and summarized data are communicated to a network manager. For example, iCAM engine 112 can be configured to process and summarized hardware resource utilization data into tables as illustrated in FIGS. 3A-3C) and communicate the tables to the network management application 111 (FIG. 1) to provided analytics related to the network.

Figure 5:
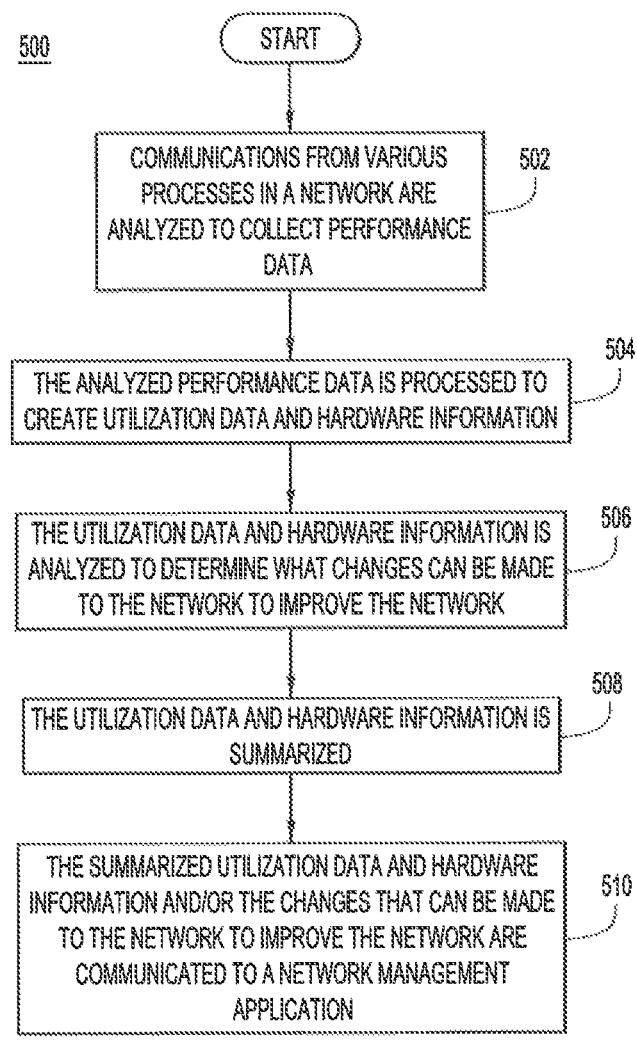
FIG. 5 is a high-level flow chart of a method for generating recommendations for improving utilization of a hardware memory resource on a network element, according to an example embodiment.

FIG. 5 is a simplified flow diagram of a process 500 involving operations of a flow that may be associated with the recommendation system based on network analytics, in accordance with an embodiment. In an embodiment, one or more operations of process 500 may be performed by iCAM engine 112. At 502, communications from various processes in a network are analyzed to collect performance data. For example, iCAM engine 112 can be configured to interact with various processes to collect access list entries. In a specific example, iCAM 112 can collect data related to how access list entries translate into hardware TCAM entries and what feature goes with a specific bank or banks. At 504, the analyzed performance data is processed to create utilization data and hardware information. For example, iCAM engine 112 can be configured to process the data and create utilization data and hardware information. At 506, the utilization data and hardware information is analyzed to determine what changes can be made to the network to improve the network. For example, iCAM engine 112 can be configured to analyze the utilization data and hardware information and determine what changes can be made to the network to improve the network. At 508, the utilization data and hardware information is summarized. For example, iCAM engine 112 can be configured to process and summarized the utilization data and hardware information into tables as shown in FIGS. 3A-3C. At 510, the summarized utilization data and hardware information and/or the changes that can be made to the network to improve the network are communicated to a network management application.

Figure 6:
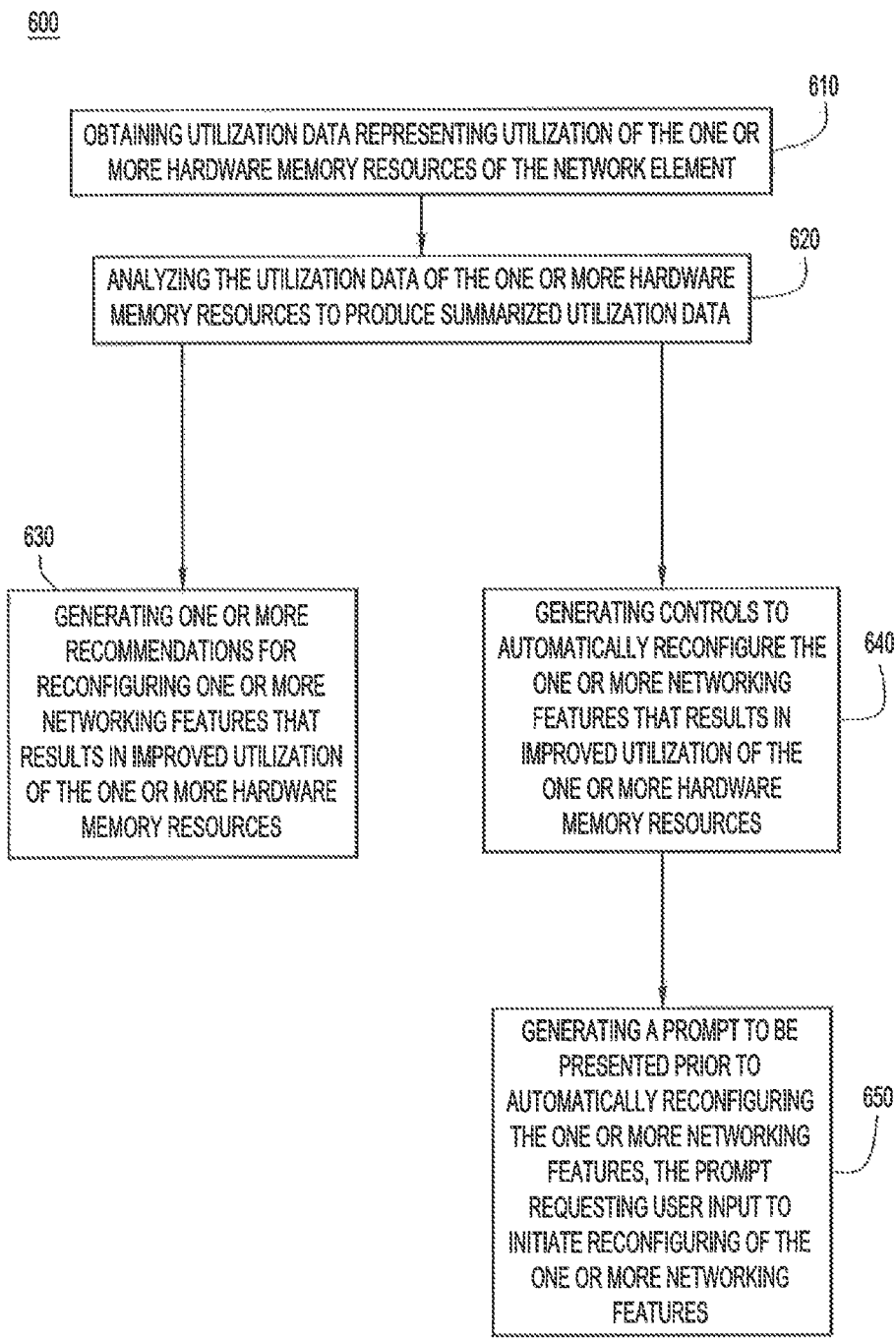
FIG. 6 is a flow chart of a method for generating recommendations for improving utilization of a hardware memory resource on a network element and for generating controls to automatically configure the network element based on the recommendations, according to an example embodiment.

Turning to FIG. 6, a flow chart is shown of a utilization management process 600 according to an example embodiment. The process 600 represents a further refinement of the processes 400 and 500 depicted in FIGS. 4 and 5. The utilization management process 600 may be performed in a network element that includes one or more hardware memory resources of fixed storage capacity for storing data used to configure a plurality of networking features of the network element. The utilization management process may run on the network element. At 610, utilization data is obtained representing utilization of the one or more hardware memory resources. Examples of the specific techniques for obtaining the utilization data are described above. At 620, analysis is performed on the utilization data of the one or more hardware memory resources to produce summarized utilization data.

At this point of process 600, there are a several further processing possibilities. For example, at 630, and as described above, based on the analyzing of step 630, one or more recommendations may be generated for reconfiguring one or more networking features that results in improved utilization of the one or more hardware memory resources. The one or more recommendations may include one or more of: allowing a merge of one of more hardware memory resources, allowing chaining of memory banks in the one or more hardware memory resources, or disallowing cross-product by moving features to different hardware interfaces of the network element or tables maintained by the hardware memory resources.

In another example, at 640, based on the analyzing performed at 620, one or more controls are generated to automatically reconfigure the one or more networking features that results in improved utilization of the one or more hardware memory resources. At 650, a prompt may be generated to be presented to a network administrator at the network management application 111 (FIG. 1) prior to automatically reconfiguring the one or more networking features. The prompt may requesting user input to initiate reconfiguring of the one or more networking features of a network element or of several network elements. When a user responds to the prompt with an appropriate user input (e.g., clicking a graphical user interface button or entering a command), the controls are supplied to the network element (using any suitable control protocol now known or hereinafter developed) to make that configuration change on the network element.

As described above, the analysis performed at 620 may involve analyzing the utilization data to indicate in the summarized utilization data a number of entries in a table of information stored by the one or more hardware memory resources used by each of the plurality of network features. In another variation, the analysis performed at 620 may involve analyzing the utilization data to indicate in the summarized utilization data a number of entries in a table of information stored by the one or more hardware memory resources used by one or more combinations of two or more of the plurality of networking features resulting from a cross-product computation resulting from the one or more combinations of two or more of the plurality of networking features.

Furthermore, as described above, the obtaining step 610 and analyzing step 620 are performed at each of a plurality of network elements in a network. In this case, the process 600 further includes communicating the summarized utilization data from each of the plurality of network elements to a network management function associated with management of the network, and presenting the summarized utilization data from each of the plurality of network elements. The presenting of the summarized utilization data may be made by way of the network management application 111 to a network administrator as described above in connection with FIG. 1.

The following are more detailed descriptions of example use cases of the iCAM engine 112.

Savings of TCAM Entries if a TCAM-Merge is Allowed

Sometimes, a network administrator (user) creates rules on a network device that result in TCAM entries that have redundancy. For example, a user may create a first ACL that says:

Src IP=1.1.1.1 Dest IP=2.1.1.1→Permit

A second ACL might say:

Src IP=1.1.1.0/24 Dest IP=2.1.1.1→Permit

This is an example with obvious redundancy. The first ACL need not be programmed in TCAM. Such redundancy might occur when there are different administrators configuring policies, or when an administrator wants to create a more generic policy without disrupting any prior policies.

Figure 7:
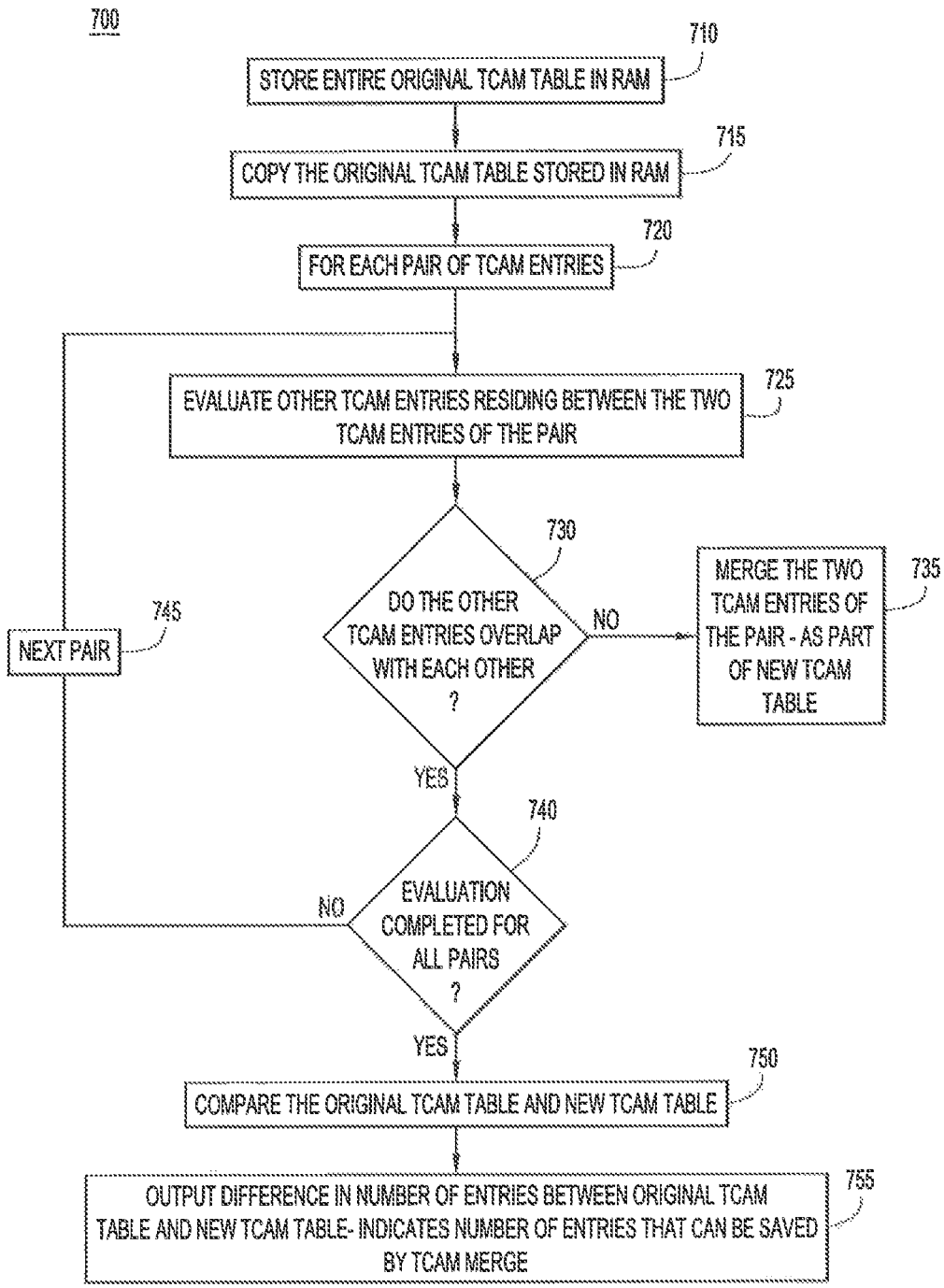
FIG. 7 is a flow chart of a method for determining the number of entries of a hardware memory resource that can be saved by a merge, according to an example embodiment.

Turning to FIG. 7, a flow chart is shown for a method 700 performed by the iCAM engine that is useful to determine the number TCAM entries that can be saved if a TCAM merge is performed. At 710, the entire original TCAM table is stored in random access memory (RAM) associated with the iCAM engine, e.g., memory 132 shown in FIG. 2. At 715, a copy of the original TCAM table is made and also stored in RAM. Next, a loop is executed as defined by operations 720-740. This loop is performed for each (and every) pair of TCAM entries in the TCAM table. At 725, the TCAM entries residing between the two TCAM entries of the pair are evaluated to determine if they overlap with each other. At 730, if the TCAM entries residing between the two TCAM entries of the pair under consideration do not overlap with each other, then at 735, the two TCAM entries of the pair can be merged together, and the result of this merged is saved in a new TCAM table in RAM. Otherwise, the process goes to step 740 where it is determined whether all pairs of the TCAM table have been evaluated. If there all pairs of the TCAM table have not been evaluated, then a new pair is selected at 745, and processing goes back to step 725. After all pairs of the TCAM table have been evaluated, at 750, a comparison is made between the original TCAM table and the new TCAM table created as a result of any merges that could be made. At 755, an output is generated for the difference in the number of entries between the original TCAM table and the new TCAM table. This difference indicates the number of entries that can be saved by the TCAM merge(s) performed at 735 in the method 700. An example output may be "User can save 2000 entries if TCAM-merge is allowed."

Storage of More ACL Entries if Bank Chaining is Allowed

In one example, there are 4 banks in a TCAM instance. Normally, a given networking feature is allowed to be configured into only one bank. This can negatively affect the utilization of the TCAM. Bank chaining allows the entries for a networking feature (e.g., ACL) to be stored across multiple banks. For example, each of the 4 bank stores 4,000 TCAM entries. If bank chaining is allowed, and no other feature is configured, then potentially 16,000 ACL entries can be store in a TCAM.

Figure 8:
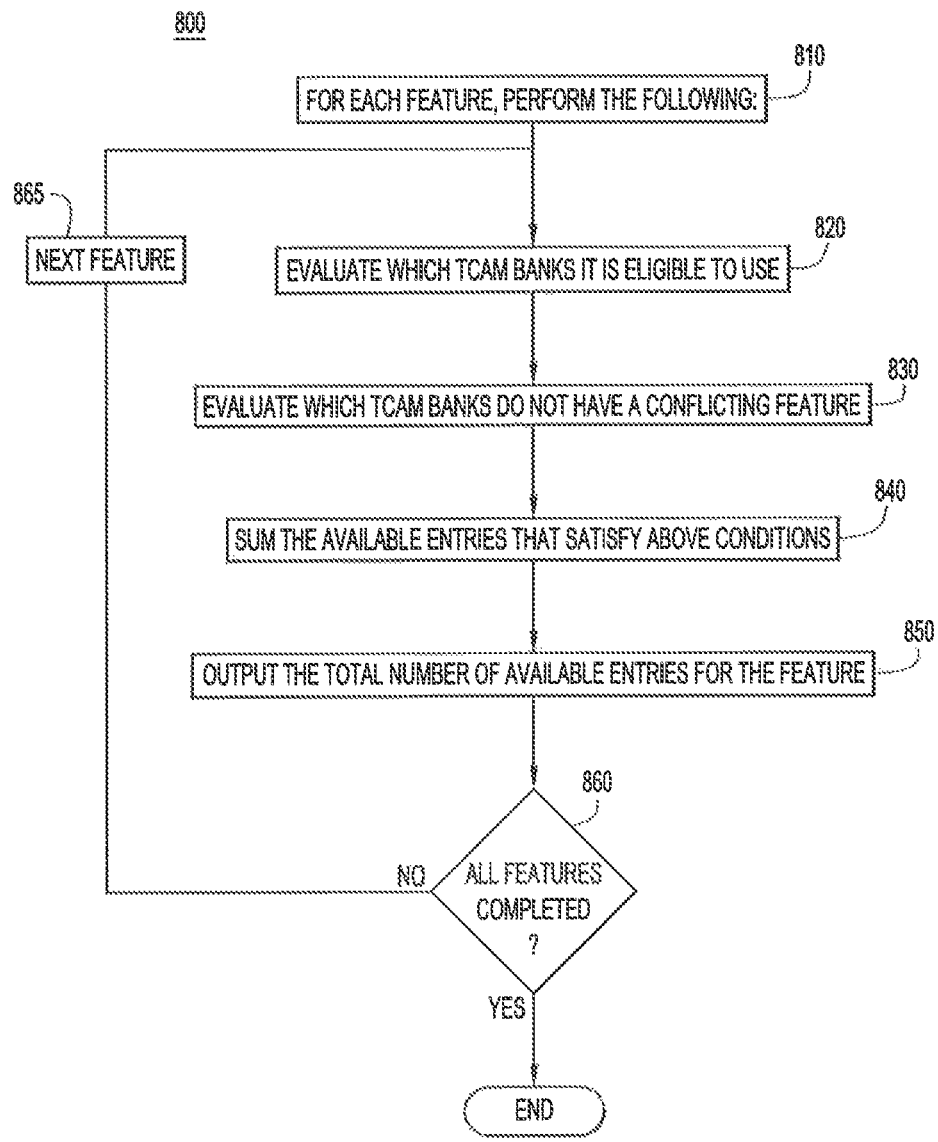
FIG. 8 is a flow chart of a method for the determining the number of additional entries of a hardware memory resource that can be made available if bank chaining is allowed for a networking feature, according to an example embodiment.

Referring now to FIG. 8, a flow chart is shown for a method 800. The method 800 determines the number of additional TCAM entries that can be used for entries if bank chaining is allowed/used for various networking features. At 810, a loop consisting of steps 820-860 is performed for each networking feature, e.g., ACL, QoS, PBR, etc. At 820, an evaluation is made of which TCAM banks a given networking feature is eligible to use. A networking feature may be eligible to use a particular TCAM bank based on hardware and other features existing on the system that drive different types of actions. At 830, an evaluation is made as to which TCAM banks do not have a conflicting feature. Features X and Y are conflicting if both cannot reside in the same TCAM bank. At 840, a sum is computed of the number of available entries that satisfy the conditions of steps 820 and 830. This sum represents the total number of entries available for the networking feature if bank chaining is allowed. At 850, the total number of available entries for the networking feature if bank chaining is allowed is output. An example output may be "User can store 4000 more ACL entries if bank chaining is allowed." At 860, it is determined whether the loop is completed for all features. If not, then the next feature is selected at 865 and the process of steps 830-850 is repeated.

Cross-Product of Multiple Features Resulting in More TCAM Entries

If two or more features co-exist in a bank of a TCAM, then each feature needs to be "satisfied' as a result of the TCAM lookup. This can result in poor utilization of a TCAM.

Figure 9:
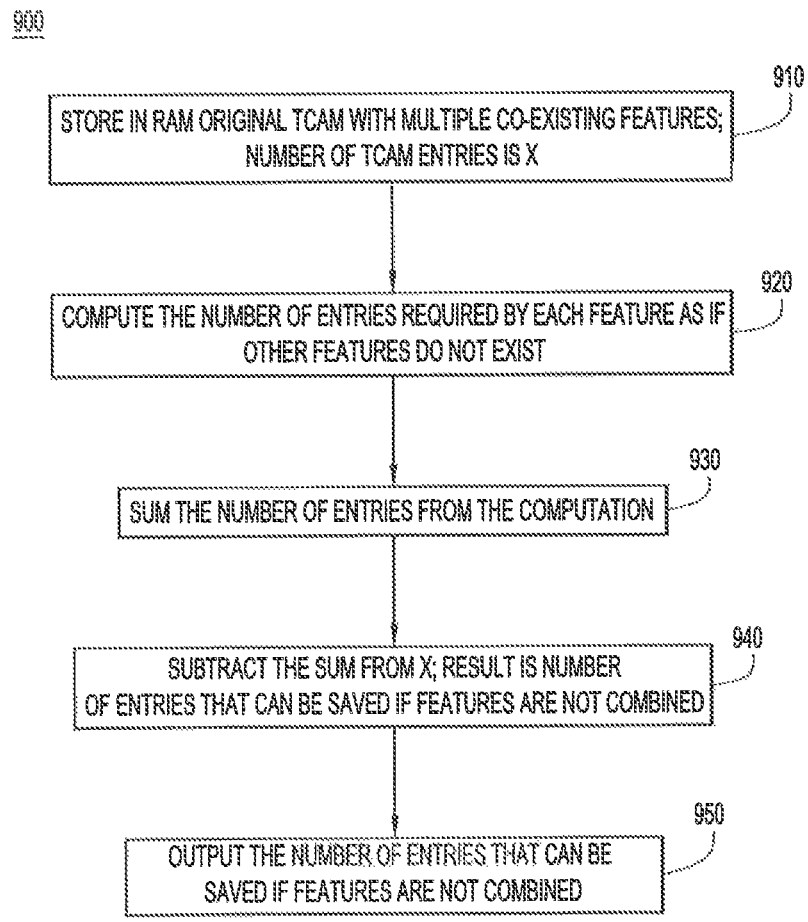
FIG. 9 is a flow chart of a method for determining the number of entries of a hardware memory resource that can be saved if multiple networking features are not combined, according to an example embodiment.

Reference is now made to FIG. 9. FIG. 9 shows a flow chart for a method 900 to determine the number of TCAM entries that can be saved if features are not combined. At 910, the content of the original TCAM (with multiple co-existing features) is stored in RAM of the networking device. The number of TCAM entries used by the TCAM is denoted as "X" for purposes of explaining the method 900. At 920, a computation is made of the number of entries required by each feature as if other features do not exist in the TCAM. At 930, a sum is made of the number of entries computed for each feature (as if other features do not exist) at step 920. At 940, the sum computed at step 930 is then subtracted from the number of used TCAM entries, X. The result of this subtraction is the number of entries that could be saved if the features are not combined (do not co-exist) in a bank of the TCAM. At 950, the result of the subtraction computed at 940 that represents the number of entries that could be saved if the features are not combined (do not co-exist) in a bank of the TCAM is output.

The methods depicted in FIGS. 7-9 may be used as part of the analysis operations performed, for example, in step 620 of the method of FIG. 6, and used as a basis for the recommendations generated at step 630, and/or as a basis for the controls generated at step 640 for automatically configuring the networking device.

In a further example, in a specific flow, the iCAM engine 112 get a callback for the show command (CMD) either from a Command Line Interface (CLI) or Extensible Markup Language (XML) interface. After receiving the CMD for a particular resource type, the iCAM engine 112 can create an MTS message for all the modules requested, send the MTS data request message to all the modules and wait for the response. All the clients registered for this message type will receive the request, (e.g., ACLQoS process 120 on the linecard will receive the request). The ACLQoS process 120 can go through the destinations in the VDCs, collect the resource information and populate an iCAM data structure. The ACLQoS process 120 can reply back the iCAM data structure as MTS payload back to iCAM engine 112. iCAM engine 112 can process the MTS reply from the clients, parse the data and format the output in the form of a simple overview of resources per feature.

Example Data Structures

```
typedef struct icam_bank_data_s
{
    uint32 in_feat_entries;
    uint32 eg_feat_entries;
    uint32 total_valid_entries;
    uint32 max_entries;
} icam_bank_data_t;
typedef struct icam_team_data_s
{
    icam_bank_data_t bank_data[ICAM_MAX_BANK];
    uint32          num_bank;
} icam_tcam_data_t;
typedef struct icam_inst_data_s
{
    icam_tcam_data_t tcam_data[ICAM_MAX_TCAM];
    uint32           num_tcams;
} icam_inst_data_t;
typedef struct icam_analytics_s
{
    char             feat_name[ICAM_MAX_FEAT_CHAR_SZ];
    icam_inst_data_t inst_data[ICAM_MAX_INST];
    uint32           num_inst;
    bool             resource_exist;
} icam_analytics_t;
```

Example iCAM Process on SUP
icam_get_resource_data
For each resource type request, construct MTS request & send message
After receiving the data from client, go thru each feature resources, the hardware type, table sizes and other related configurations
If the resource exist for a particular feature, for that feature, go thru all the populated instances/team/bank.
If the team entries is non-zero, print the feature, number of team entries, number of free entries, instance, team, bank and percentage utilization.

Repeat the same of egress resources
Based on the above analytics, create the list of recommendations.
Example ACLQOS Process on Linecard
aclqos_get_feature_team_resource
Call this function upon receiving a request for resource data from icam
For each VDC, go thru all the destinations.
For each destination go thru all the team resources.
If the destination has only one feature then collect & sum up the team entries for that feature.
If the destination has multiple features, find the feature combination entry & sum up the team entries for that feature combination.
Also populate other data like, total valid entries, max team entries, etc.
Do the above steps for both ingress & egress policies on each destination.
Example Code Organization
The code cab be organized as follows:
feature/icam—New icam feature code
feature/forwarding-sw/aclqos—ACLQoS Client PI code
network/dc3/aclqos/common—ACLQoS Client PD Common code.
Example End User Interface
Network Element Operating System CLI:
Config CLI:
feature icam
icam auto-learn
Show CLI:
Show icam module x [fe y|interface eth a/b]
Show icam brief module x [fe y|interface eth a/b]
show icam recommendation module x [fe y|interface eth a/b]
show icam recommendation optimize [space|speed]
// Optimize TCAM space or optimize time taken for TCAM updates
Notes:
fe is forwarding engine
Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, communication system 100 may be applicable to other protocols and arrangements. In addition, although communication system 100 has been illustrated with reference to particular elements and operations that facilitate the communication process, these elements and operations may be replaced by any suitable architecture or process that achieves the intended functionality of communication system 100.

As explained above, different TCAMs on a network element can be used for different networking features/functions for ingress and egress. TCAMs can become full due to how certain features/functions on the network element are configured. According to the present disclosure, iCAM recommendation software analyzes the TCAM utilization data and makes recommendations about how to improve TCAM utilization, and/or automatically configure one or more network elements.

In summary, in one form, a method is provided in which, in a network element that includes one or more hardware memory resources of fixed storage capacity for storing data used to configure a plurality of networking features of the network element and a utilization management process running on the network element, the utilization management process including: obtaining utilization data representing utilization of the one or more hardware memory resources; and analyzing the utilization data of the one or more hardware memory resources to produce summarized utilization data.

In one example, based on the analyzing, the method further includes generating one or more recommendations for reconfiguring one or more networking features that results in improved utilization of the one or more hardware memory resources. The one or more recommendations include any one or more of: allowing a merge of one of more hardware memory resources, allowing chaining of memory banks in the one or more hardware memory resources, or disallowing cross-product by moving features to different hardware interfaces of the network element or tables maintained by the hardware memory resources. It should be understood that any single one or more of a plurality of networking features can be individually reconfigured based on analysis, such as allowing merge of one of more hardware memory resources, allowing chaining of memory banks, disallowing cross-product by moving features to different hardware interface, disabling statistics can reduce the TCAM memory usage, reducing the LOU threshold to give more TCAM space.

In another example, based on the analyzing, the method further includes generating one or more controls to automatically reconfigure the one or more networking features that results in improved utilization of the one or more hardware memory resources. The method may further include generating a prompt to be presented prior to automatically reconfiguring the one or more networking features, the prompt requesting user input to initiate reconfiguring of the one or more networking features.

In still another example, the method may further include, based on the analyzing, generating information indicating how much utilization efficiency of the one or more hardware memory resources can be obtained by one or more of: allowing a merge of one or more hardware memory resources, allowing chaining of memory banks in the one or more hardware memory resources for one or more networking features; or disallowing combinations of two or more networking features in the one or more hardware memory resources.

In yet another example, the analyzing may include analyzing the utilization data to indicate in the summarized utilization data a number of entries used by the one or more hardware memory resources for each of the plurality of network features.

In still another example, the analyzing includes analyzing the utilization data to indicate in the summarized utilization data a number of entries in a table of information stored by the one or more hardware memory resources used by one or more combinations of two or more of the plurality of networking features resulting from a cross-product computation resulting from the one or more combinations of two or more of the plurality of networking features.

The obtaining and analyzing operations may be performed at each of a plurality of network elements in a network, and the method further includes: communicating the summarized utilization data from each of the plurality of network elements to a network management function associated with management of the network; and presenting (at a network management application to a network administrator or other user/individual) the summarized utilization data from each of the plurality of network elements.

In yet a further example, the analyzing includes analyzing the utilization data to indicate in the summarized utilization data which networking feature goes to which bank of a plurality of banks in the one or more hardware memory resources.

In still another example, the method may further include monitoring the summarized utilization data over time from one or several network elements in the network, and generating analytics over time from the summarized utilization data. The analytics may be used to determine operating conditions of a network.

The generating of the hardware memory resource (e.g., TCAM) usage/analytics information and the monitoring operations can be performed separately from generating one or more recommendations (based on the usage/analytics information) to efficiently use the hardware memory resources.

Similarly, in another form, an apparatus is provided comprising: one or more hardware memory resources of fixed storage capacity for storing data used to configure a plurality of networking features of the network element and a utilization management process running on a network element; a processor in communication with the one or more hardware memory resources, wherein the processor is configured to perform operations including: obtaining utilization data representing utilization of the one or more hardware memory resources; and analyzing the utilization data of the one or more hardware memory resources to produce summarized utilization data.

In still another form, one or more non-transitory computer readable storage media encoded with instructions that, when executed by a processor of a network element that includes one or more hardware memory resources of fixed storage capacity for storing data used to configure a plurality of networking features of the network element, cause the processor to perform operations including: obtaining utilization data representing utilization of the one or more hardware memory resources; and analyzing the utilization data of the one or more hardware memory resources to produce summarized utilization data.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. In a network element that includes one or more hardware memory resources of fixed storage capacity for storing data used to configure one or more networking features of the network element, performing a method comprising:
    obtaining utilization data representing utilization of the one or more hardware memory resources by collecting data related to how the one or more networking features translate into usage of the one or more hardware memory resources;
    analyzing the utilization data of the one or more hardware memory resources to produce summarized utilization data by mapping the one or more networking features with a corresponding bank in the one or more hardware memory resources; and
    based on the summarized utilization data produced by analyzing, generating information indicating how much utilization efficiency of the one or more hardware memory resources can be obtained by reconfiguring the one or more networking features.

2. The method of claim 1, further comprising:
    based on the summarized utilization data produced by analyzing the utilization data, generating one or more recommendations for reconfiguring the one or more networking features that results in an improved utilization of the one or more hardware memory resources.

3. The method of claim 2, wherein the one or more recommendations include one or more of: allowing a merge of the one or more hardware memory resources, allowing chaining of memory banks in the one or more hardware memory resources, or disallowing cross-product by moving features to different hardware interfaces of the network element or tables maintained by the one or more hardware memory resources.

4. The method of claim 1, further comprising:
    based on the summarized utilization data produced by analyzing the utilization data, generating one or more controls to automatically reconfigure the one or more networking features that results in an improved utilization of the one or more hardware memory resources.

5. The method of claim 4, further comprising:
    generating a prompt to be presented prior to automatically reconfiguring the one or more networking features, the prompt requesting user input to initiate reconfiguring of the one or more networking features.

6. The method of claim 1, wherein generating the information includes:
    based on the summarized utilization data produced by analyzing the utilization data, generating the information indicating how much the utilization efficiency of the one or more hardware memory resources can be obtained by one or more of: allowing a merge of one or more hardware memory resources, allowing chaining of memory banks in the one or more hardware memory resources for the one or more networking features; or disallowing combinations of two or more networking features in the one or more hardware memory resources.

7. The method of claim 1, wherein analyzing the utilization data includes analyzing the utilization data to indicate in the summarized utilization data a number of entries used by the one or more hardware memory resources for each of the one or more networking features.

8. The method of claim 1, wherein analyzing the utilization data includes analyzing the utilization data to indicate in the summarized utilization data a number of entries in a table of information stored by the one or more hardware memory resources used by one or more combinations of two or more networking features resulting from a cross-product computation resulting from the one or more combinations of the two or more networking features.

9. The method of claim 1, further comprising:
communicating, to a network management function, the summarized utilization data that is combined with additional summarized utilization data received from a plurality of other network elements in a network.

10. The method of claim 1, further comprising:
populating a data structure in the network element with the summarized utilization data,
wherein the mapping includes mapping one or more access control lists to the corresponding bank in the one or more hardware memory resources that is a content addressable memory.

11. The method of claim 1, wherein analyzing the utilization data to produce the summarized utilization data includes:
analyzing the utilization data to produce the summarized utilization data that includes a first utilization of an ingress resource by the one or more networking features and a second utilization of an egress resource by the one or more networking features.

12. The method of claim 1, wherein the one or more networking features of the network element include one or more of a router access control list, a virtual local area network access control list, and a port access control list and the method further comprises:
based on analyzing the utilization data, generating one or more recommendations including a combination of at least two of the one or more networking features to be mapped to the corresponding bank.

13. An apparatus comprising:
one or more hardware memory resources of fixed storage capacity for storing data used to configure one or more networking features of a network element and used to run a utilization management process; and
a processor in communication with the one or more hardware memory resources, wherein the processor is configured to:
obtain utilization data representing utilization of the one or more hardware memory resources by collecting data related to how the one or more networking features translate into usage of the one or more hardware memory resources;
analyze the utilization data of the one or more hardware memory resources to produce summarized utilization data by mapping the one or more networking features with a corresponding bank in the one or more hardware memory resources; and
based on the summarized utilization data produced by analyzing the utilization data, generate information indicating how much utilization efficiency of the one or more hardware memory resources can be obtained by reconfiguring the one or more networking features.

14. The apparatus of claim 13, wherein the processor is further configured to:
based on the processor analyzing the utilization data, generate one or more recommendations for reconfiguring the one or more networking features that results in an improved utilization of the one or more hardware memory resources.

15. The apparatus of claim 13, wherein the processor is further configured to:
based on the processor analyzing the utilization data, generate one or more controls to automatically reconfigure the one or more networking features that results in an improved utilization of the one or more hardware memory resources.

16. The apparatus of claim 13, wherein the processor is further configured to:
based on the processor analyzing the utilization data, generate the information indicating how much the utilization efficiency of the one or more hardware memory resources can be obtained by one or more of: allowing a merge of the one or more hardware memory resources, allowing chaining of memory banks in the one or more hardware memory resources for the one or more networking features; or disallowing combinations of two or more networking features in the one or more hardware memory resources.

17. The apparatus of claim 13, wherein the processor is configured to analyze the utilization data to indicate in the summarized utilization data a number of entries in a table of information stored by the one or more hardware memory resources used by one or more combinations of two or more networking features resulting from a cross-product computation resulting from the one or more combinations of the two or more networking features.

18. One or more non-transitory computer readable storage media encoded with instructions that, when executed by a processor of a network element that includes one or more hardware memory resources of fixed storage capacity for storing data used to configure one or more networking features of the network element, cause the processor to perform operations including:
obtaining utilization data representing utilization of the one or more hardware memory resources by collecting data related to how the one or more networking features translate into usage of the one or more hardware memory resources;
analyzing the utilization data of the one or more hardware memory resources to produce summarized utilization data by mapping the one or more networking features with a corresponding bank in the one or more hardware memory resources; and
based on the summarized utilization data produced by analyzing the utilization data, generating information indicating how much utilization efficiency of the one or more hardware memory resources can be obtained by reconfiguring the one or more networking features.

19. The non-transitory computer readable storage media of claim 18, further including instructions that cause the processor to generate one or more recommendations for reconfiguring the one or more networking features that results in an improved utilization of the one or more hardware memory resources.

20. The non-transitory computer readable storage media of claim 18, wherein the instructions operable for the analyzing include instructions that cause the processor to indicate in the summarized utilization data a number of entries used by the one or more hardware memory resources for the one or more networking features.

\* \* \* \* \*